(12) United States Patent
Saitou et al.

(10) Patent No.: US 8,173,735 B2
(45) Date of Patent: May 8, 2012

(54) RESIN ADDITIVE MASTER BATCH

(75) Inventors: Hitoshi Saitou, Saitama (JP); Mitsuru Fukushima, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/525,677

(22) PCT Filed: Jan. 30, 2008

(86) PCT No.: PCT/JP2008/051402
§ 371 (c)(1),
(2), (4) Date: Aug. 4, 2009

(87) PCT Pub. No.: WO2008/096649
PCT Pub. Date: Aug. 14, 2008

(65) Prior Publication Data
US 2010/0093899 A1    Apr. 15, 2010

(30) Foreign Application Priority Data
Feb. 5, 2007   (JP) .................. 2007-026155

(51) Int. Cl.
*C08K 3/32*    (2006.01)
*C08K 5/16*    (2006.01)
*C08K 5/1575*  (2006.01)

(52) U.S. Cl. .......... 524/450; 524/99; 524/606; 524/136; 524/394

(58) Field of Classification Search .................. 524/450, 524/99, 606, 136, 394
See application file for complete search history.

(56) References Cited

U.S. PATENT DOCUMENTS

| | | | | |
|---|---|---|---|---|
| 5,342,868 A | * | 8/1994 | Kimura et al. ............... | 524/108 |
| 6,596,198 B1 | * | 7/2003 | Semen ..................... | 252/400.24 |
| 6,787,067 B2 | * | 9/2004 | Yukino et al. ............ | 252/400.23 |
| 2005/0104033 A1 | | 5/2005 | Schmidt et al. | |
| 2009/0088513 A1 | * | 4/2009 | Yukino et al. ................ | 524/450 |

FOREIGN PATENT DOCUMENTS

| | | |
|---|---|---|
| EP | 1 266 932 B1 | 1/2006 |
| JP | 02-073837 A | 3/1990 |
| JP | 07-278448 A | 10/1995 |
| JP | 09-052956 A | 2/1997 |
| JP | 09-087290 A | 3/1997 |
| JP | 10-512320 A | 11/1998 |
| JP | 2000-080172 A | 3/2000 |
| JP | 2001081236 A | 3/2001 |
| JP | 2001-123021 A | 5/2001 |
| JP | 2004292710 A | 10/2004 |
| JP | 2004-346100 A | 12/2004 |
| JP | 2005314474 A | 11/2005 |
| WO | 02/36677 A1 | 5/2002 |

OTHER PUBLICATIONS

Lewis, Richard J., Sr. (2002). Hawley's Condensed Chemical Dictionary (14 the Ed.). John Wiley & Sons.*
Supplemental European Search Report for EP 08704165, dated Feb. 8, 2010.
International Search Report for PCT/JP2008/051402, dated Mar. 4, 2008.

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

The invention provides a resin additive master batch which can contain a resin additive having a melting point of not higher than 80° C. higher to a high concentration, with which breakage of a strand does not occur and continuous production can be attained, and with which the surface tackiness of pellets is improved. The resin additive master batch comprises 80 to 150 parts by weight of (B) resin additive having a melting point of not higher than 80° C., and 0.3 to 5 parts by weight of (C) organic acid metal salt, with respect to 100 parts by weight of (A) polyolefin resin. As the (B) resin additive having a melting point of not higher than 80° C., a UV absorber, a hindered amine compound or a mixture thereof is preferred.

3 Claims, No Drawings

RESIN ADDITIVE MASTER BATCH

TECHNICAL FIELD

The present invention relates to a resin additive master batch (hereinafter also referred to as simply "master batch"). More particularly, the present invention relates to a resin additive master batch obtained by blending a nucleating agent when producing a polyolefin master batch containing a resin additive having a melting point of not higher than 80° C. to a high concentration.

BACKGROUND ART

Resin additives such as phenolic antioxidants, UV absorbers and hindered amine compounds are known to suppress degradation by light or heat of organic materials such as synthetic resins.

As the compounds used as the resin additives, those compounds having a high melting point, low ability to plasticize the resin and small vaporization from the resin, such as tetrakis(3-(3,5-di-tert-butyl-4-hydroxyphenyl)propionyloxymethyl)methane and tris(2,4-di-tertiary butylphenyl)phosphite, are usually preferred. However, when the molecular weight of the compound is too high, the additive cannot move in the resin, so that the stabilizing effect thereof tends to be decreased.

On the other hand, compounds having a low melting point, such as stearyl (3,5-di-tert-butyl-4-hydroxyphenyl) propionate and bis(2,2,6,6-tetramethylpiperidyl) sebacate have a relatively low molecular weight and have an excellent stabilizing effect at an early stage. However, since they are easy to vaporize from the resin, their long term stabilizing effect is poor, and since they are liquid or viscous, or, in case of powdery compounds, they form large lumps due to caking when stored, their handling property is poor. To improve their handling property, it is necessary to make the compounds into the form of a master batch.

However, since usual hindered amine compounds have a low compatibility with polyolefins resins, there is a problem in that the hindered amine compound exude from the surface of the pellets, which results in the caking of the pellets when a master batch containing a high concentration of a hindered amine compound is prepared. Therefore, the hindered amine compounds can be blended to an amount of only about 50 parts by weight per 100 parts by weight of a polyolefin, so that the merit to make the composition into the form of a master batch is small.

Especially, while the hindered amine compounds obtained by reacting 2,2,6,6-tetramethylpiperidinols with a fatty acid have an excellent weatherability-imparting effect, they have a low molecular weight and are likely to be liquefied. When they are made into a master batch with a resin in order to improve their handling property, since the additive exudes from the surface of the resin composition made into the form of a master batch and shows adhesiveness, it is necessary for the master batch to have a low concentration. There is also a problem in that when the concentration is high, the strength of the composition during the production of the master batch is low, so that pellets cannot be produced stably and continuously.

As the methods for improving the handling property or the like of the additives, for example, a method in which the tackiness is suppressed by making the master batch using an oil-absorbing polymer (Patent Document 1); a method in which the composition is made into a master batch having a core layer and a sheath layer to prevent the breakage of strands (Patent Document 2); a method in which the composition is made into microcapsules (Patent Document 3); and a method in which the powder characteristics are improved by enhancing the crystallization of a low melting flame retardant (Patent Document 4) have been proposed. All of these are techniques improving the ease of handling of liquid and low melting additives.

Patent Document 1: Japanese Unexamined Patent Application Publication No. 9-52956 (Claims)

Patent Document 2: Japanese Unexamined Patent Application Publication No. 2000-80172 (Claims)

Patent Document 3: Japanese Unexamined Patent Application Publication (Translation of PCT Application) No. 10-512320 (Claims)

Patent Document 4: Japanese Unexamined Patent Application Publication No. 9-87290 (Claims)

DISCLOSURE OF THE INVENTION

Problems to be Solved by the Invention

However, as described above, it is difficult to produce a master batch having a high concentration. If an oil-absorbing polymer is used as described in Patent Document 1, the oil-absorbing polymer remains in the obtained resin composition. Making the composition into microcapsules is costly, and while enhancement of crystallization improves the ease of handling when compared with amorphous compositions, the method cannot be applied to liquid products. Moreover, in cases where the crystal products have a low melting point, the effect to prevent caking is small. Thus, by the conventional methods, the effect to improve the handling property is limited.

Accordingly, an object of the present invention is to solve the above-described problems and to provide a resin additive master batch which can contain a resin additive having a melting point of not higher than 80° C. to a high concentration, with which continuous production can be attained without breakage of a strand, and with which the surface tackiness of pellets is improved.

Means for Solving the Problems

In view of these circumstances, the present inventors have intensively studied to discover that a master batch with which breakage of a strand hardly occurs during the production, with which the tackiness of the pellets is small, and which has an excellent handling property, can be obtained by blending an organic acid metal salt with polyolefin resin in a prescribed amount when producing a master batch in which a resin additive having a melting point of not higher than 80° C. is blended to a high concentration, thereby reaching the present invention.

That is, the resin additive master batch according to the present invention comprises 80 to 150 parts by weight of (B) resin additive having a melting point of not higher than 80° C., and 0.3 to 5 parts by weight of (C) organic acid metal salt, with respect to 100 parts by weight of (A) polyolefin resin.

In the present invention, the (B) resin additive having a melting point of not higher than 80° C. is preferably a UV absorber, hindered amine compound or a mixture thereof.

In the present invention, the above-described (B) resin additive having a melting point of not higher than 80° C. is also preferably a compound represented by the following General Formula (1):

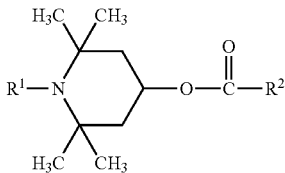

(1)

(wherein $R^1$ represents a hydrogen atom, hydroxyl group, $C_1$-$C_{30}$ alkyl group, hydroxyalkyl group, alkoxy group, hydroxyalkoxy group or an oxy radical; and $R^2$ represents a $C_1$-$C_{30}$ alkyl group or a $C_2$-$C_{30}$ alkenyl group), more preferably, a compound represented by General Formula (1) wherein $R^2$ is a mixture of $C_8$-$C_{26}$ alkyl groups.

Further, in the present invention, the above-described (C) organic acid metal salt is preferably a metal organic carboxylate having a cyclic structure, a phosphoric acid ester metal salt compound represented by the following General Formula (2):

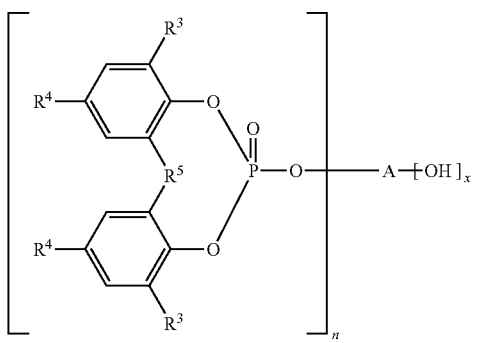

(2)

(wherein $R^3$ represents a $C_4$-$C_8$ alkyl group; $R^4$ represents a hydrogen atom or a $C_1$-$C_8$ alkyl group; $R^5$ represents a $C_1$-$C_4$ alkylidene group; A represents a metal having a valency of n+x; n represents a number of 1 to 3; and x represents a number of 0 to 2), or a mixture thereof.

Effects of the Invention

The present invention enabled to realize a resin additive master batch having an excellent handling property and containing a low melting resin additive to a high concentration.

BEST MODE FOR CARRYING OUT THE INVENTION

Preferred embodiments of the present invention will be described in detail below.

As the (A) polyolefin resin used in the present invention, any polyolefin can be employed without a limitation. Examples of the polyolefin include α-olefin homopolymers and copolymers, such as polypropylene, low density polyethylene, linear low density polyethylene, high density polyethylene, polybutene-1, poly-3-methylpentene, poly-4-methylpentene, ethylene-propylene copolymers and the like.

Examples of the (B) resin additive having a melting point of not higher than 80° C. used in the present invention includes antioxidants, UV absorbers, photostabilizers, mixtures thereof and the like.

Examples of the antioxidants having a melting point of not higher than 80° C. include phenolic antioxidants, phosphorus-containing antioxidants, sulfur-containing antioxidants, phosphite antioxidants, thioether antioxidants and the like. Examples of the UV absorber having a melting point of not higher than 80° C. include salicylic acid UV absorbers, benzophenone UV absorbers, benzotriazole UV absorbers, cyanoacrylate UV absorbers and the like. Further, examples of the photostabilizer having a melting point of not higher than 80° C. include hindered amine compounds and the like.

More particularly, examples of the phenolic antioxidants include stearyl (3,5-ditertiary butyl-4-hydroxyphenyl)propionate; thiobis(3-(3,5-ditertiary butyl-4-hydroxyphenyl)propionyloxy)ethyl; triethylene glycol bis[(3-tertiary butyl-4-hydroxy-5-methylphenyl)propionate]; 2,4-bis octylthio-6-(3,5-ditertiary butyl-4-hydroxyanilino)-s-triazine; 2-methyl-4,6-bis(octylthiomethyl)phenol; 2,4-dimethyl-6-(1-methylpentadecyl)phenol, ester of branched C7-9 mixed alcohol and (3,5-ditertiary butyl 4-hydroxyphenyl)propionic acid; 2,2-thiobis(4-methyl-6-tertiary butylphenol) and the like.

Examples of the phosphite antioxidants having a melting point of not higher than 80° C. include triphenyl phosphite; trisnonylphenyl phosphite; distearylpentaerythritol diphosphite; bisnonylphenylpentaerythritol diphosphite; phosphite of bisphenol A and C12-15 mixed alcohol; diphenyl-2-ethylhexyl phosphite; diphenylisodecyl phosphite; triisodecyl phosphite; phosphite of 1,1-butylidenebis(2-methyl-4-hydroxy-5-tertiary butylphenyl) and tridecyl alcohol; phosphite of 1,1,3-tris(2-methyl-4-hydroxy-5-tertiary butylphenyl)butane and tridecyl alcohol and the like.

Examples of the thioether antioxidants having a melting point of not higher than 80° C. include dilaurylthiodipropionate, ditridecylthiodipropionate, distearylthiodipropionate, pentaerythritoltetrakis(3-dodecylthiopropionate) and 4,4-thiobis(2-tertiary butyl-5-methylphenol)bis-3-(dodecylthio) propionate.

Examples of the UV absorbers having a melting point of not higher than 80° C. include hexadecyl-3,5-ditertiary butyl-4-hydroxybenzoate; 2-hydroxy-4-methoxybenzophenone; 2-hydroxy-4-octoxybenzophenone; 2-hydroxy-4-dodecyloxybenzophenone; 2,2'-dihydroxy-4-methoxybenzophenone; 4-(2-acryloyloxy)ethoxy-2-hydroxybenzophenone polymer; 2-(2'-hydroxy-3',5'-ditertiary pentylphenyl)benzotriazole; ester of C7-9 mixed alcohol and 3-(3-(2H-benzotriazol-2-yl)-4-hydroxy-5-tertiary butylphenyl)propionic acid; ester of polyethylene glycol and 3-(3-(2H-benzotriazol-2-yl)-4-hydroxy-5-tertiary butylphenyl)propionic acid; 2-(2H-benzotriazol-2-yl)-4-methyl-6-dodecylphenol(dodecyl is a mixture of linear chain and branched chain.); ester of octanol and 3-(3-(5-chloro-2H-benzotriazol-2-yl)-4-hydroxy-5-tertiary butylphenyl)propionic acid; 2-(4-octyloxyphenyl)-4,6-bis(2,4-dimethylphenyl)-1,3,5-triazine; 2-(4-isooctyloxyphenyl)-4,6-bis(2,4-dimethylphenyl)-1,3,5-triazine, 2-(2-hydroxy-4-(3-(2-ethylhexyl-1-oxy)-2-hydroxypropyloxy) phenyl)-4,6-bis(2,4-dimethylphenyl)-1,3,5-triazine; 2'-ethylhexyl-2-cyano-3-phenylcinnamate; N-(2-ethoxyphenyl)-N'-(4-isododecylphenyl)oxamide and the like.

Examples of the hindered amine compounds having a melting point of not higher than 80° C. include 2,2,6,6-tetramethyl-4-piperidinol fatty acid esters; bis(2,2,6,6-tetramethyl-4-piperidyl) sebacate; mixture of bis(1,2,2,6,6-pentamethyl-4-piperidyl) sebacate and methyl-1,2,2,6,6-pentamethyl-4-piperidyl sebacate; tetraester of mixed alcohol of 1,2,2,6,6-pentamethylpiperidinol and tridecyl alcohol and butanetetracarboxylic acid; tetraester of mixed alcohol of 2,2,6,6-tetramethylpiperidinol and tridecyl alcohol and butanetetracarboxylic acid; bis(1-octyloxy-2,2,6,6-pentamethyl-4-piperidyl) sebacate; polyester of 1-(2-hydroxyethyl)-2,2,6,6-tetramethyl-4-piperidinol and butanediolic acid; reaction product of 2,2,6,6-tetramethyl-4-(2-propenyloxy)piperidine and methylhydrogensiloxane; mixture of dodecyl-3-(2,2,4,4-tetramethyl-21-oxo-7-oxa-3,20-diazodispiro(5.1.11.2)henicosane-20-yl)propionate and tetradecyl-3-(2,2,4,4-tetramethyl-21-oxo-7-oxa-3,20-diazodispiro (5.1.11.2)henicosane-20-yl)propionate; mixture of dodecyl-N-(2,2,6,6-tetramethylpiperidine-4-yl)-b-alaninate and tetradecyl-N-(2,2,6,6-tetramethylpiperidine-4-yl)-b-alanate; 3-dodecyl-N-(2,2,6,6-tetramethylpiperidine-4-yl)succinimide; and 2-dodecyl-N-(1-acetyl-2,2,6,6-tetramethylpiperidine-4-yl).

The (B) resin additive may be an individual compound selected from these compounds or may be in the form of an additive composition which is a mixture of these compounds, which has a melting point of not higher than 80° C. In case of compounds whose starting materials are aliphatic alcohols or aliphatic acids, the resin additive may be an additive composition which is a mixture such as mixed ester compounds (ester compounds having mixed groups) or a mixed amide compounds (amide compounds having mixed groups) obtained from mixed alcohols or mixed fatty acids, which has a melting point of not higher than 80° C.

The above-described (B) resin additive has a melting point of not higher than 80° C., preferably not higher than 60° C., and includes those which are liquid at normal temperature.

The above-described (B) resin additive is preferably a compound represented by the above-described General Formula (1). In General Formula (1), examples of the $C_1$-$C_{30}$ alkyl group represented by $R^1$ and $R^2$ include methyl, ethyl, propyl, isopropyl, butyl, isobutyl, secondary butyl, tertiary butyl, pentyl, secondary pentyl, tertiary pentyl, hexyl, heptyl, octyl, isooctyl, 2-ethylhexyl, tertiary octyl, nonyl, isononyl, decyl, undecyl, dodecyl, tridecyl, tetradecyl, pentadecyl, hexadecyl, heptadecyl, octadecyl and the like. Especially, $R_2$ is preferably a mixture of $C_8$-$C_{26}$ alkyl groups.

In General Formula (1), examples of the $C_1$-$C_{30}$ hydroxyalkyl groups represented by $R^1$ include the hydroxy substitution products of the above-described alkyl groups such as hydroxyethyl, 2-hydroxypropyl, 3-hydroxypropyl and the like.

Further, in General Formula (1), examples of the $C_1$-$C_{30}$ alkoxy group represented by $R^1$ include methoxy, ethoxy, propoxy, isopropoxy, butoxy, octoxy, 2-ethylhexyloxy and the like that correspond to the above-described alkyl groups.

Further, in General Formula (1), examples of the $C_1$-$C_{30}$ hydroxyalkoxy group represented by $R^1$ include hydroxyethyloxy, 2-hydroxypropyloxy, 3-hydroxypropyloxy, 4-hydroxybutyloxy, 2-hydroxy-2-methylpropyloxy, 6-hydroxyhexyloxy and the like that correspond to the above-described alkoxy group.

Further, in General Formula (1), examples of the $C_2$-$C_{30}$ alkenyl group represented by $R^2$ include vinyl, propenyl, butenyl, hexenyl, oleyl and the like. The double bond position may be any of α-position, inside or ω-position.

More specific examples of the compounds represented by the above-described Formula (1) include the Compound Nos. 1 to 6 shown below. However, the present invention is not restricted at all by the compounds below.

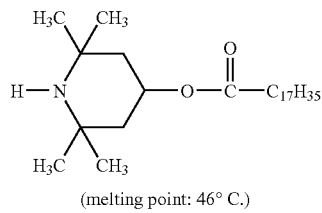

Compound No. 1

(melting point: 46° C.)

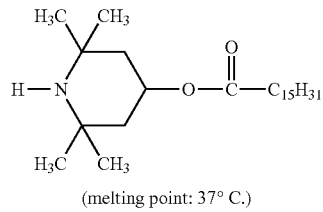

Compound No. 2

(melting point: 37° C.)

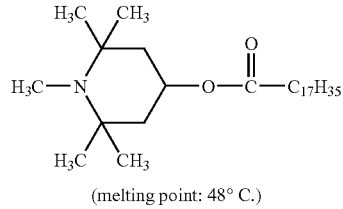

Compound No. 3

(melting point: 48° C.)

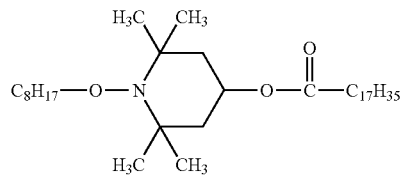

Compound No. 4

(liquid at normal temperature)

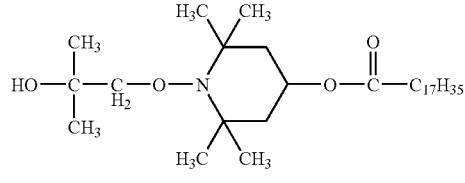

Compound No. 5

(melting point: 63° C.)

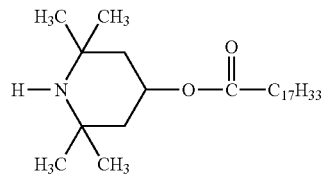

Compound No. 6

(liquid at normal temperature)

Among the above-described compounds represented by General Formula (1), the compounds other than Compound No. 5 have a melting point of not higher than 60° C. and are especially preferred. The synthetic process of these compounds represented by General Formula (1) is not particularly restricted, and the compounds can be synthesized by usual organic synthesis processes. For example, esterification can be attained by direct esterification between an acid and an alcohol, by reaction between an acid halide and an alcohol, by an ester exchange reaction or the like. As the purification method, distillation, recrystallization, reprecipitation and a method in which a filtering material or absorption material is used, may appropriately be employed.

It is required that the (B) resin additive be blended in an amount of 80 to 150 parts by weight with respect to 100 parts by weight of the (A) polyolefin resin. If the content of the (B) resin additive is less than 80 parts by weight, addition of a large amount of the master batch is required so that the merit of using a master batch having a high concentration is decreased. On the other hand, if the content is more than 150 parts by weight, the additive is likely to exude and caking of the pellets occurs, so that the storage stability is degraded.

The (C) organic acid metal salt used in the present invention is selected from the group consisting of metal salts of organophosphoric acids, organic phosphine acids, organic phosphonic acids, organic carboxylic acids, organic-sulfonic-acid, organic sulfonic acids and organic thiosulfuric acids, and especially, organic carboxylic acid metal salts having a cyclic structure and organophosphoric acid ester metal salts are preferred. The metal also is selected from the group consisting of lithium, sodium, potassium, calcium, magnesium, barium, manganese, iron, nickel, copper, silver, zinc and aluminum.

Examples of the carboxylic acid in the above-described organic carboxylic acid metal salts include gluconic acid, capronic acid, lauric acid, myristic acid, stearic acid, 12-hydroxystearic acid, cyclopentane carboxylic acid, dicyclopentane carboxylic acid, cyclohexane carboxylic acid, dicycloheptane carboxylic acid, benzoic acid, p-t-butyl benzoic acid, di-t-butyl benzoic acid, naphthenic acid, succinic acid, adipic acid, sebacic acid and the like. As the organic carboxylic acid metal salt, those having a cyclic structure, such as disodium-bicyclo(2,2,1)heptane-2,3-dicarboxylate, aluminum para-t-butyl benzoate and sodium benzoate, are excellent and preferred.

As the organic phosphoric acid ester metal salt compounds, the compounds represented by the General Formula (2) below are preferred.

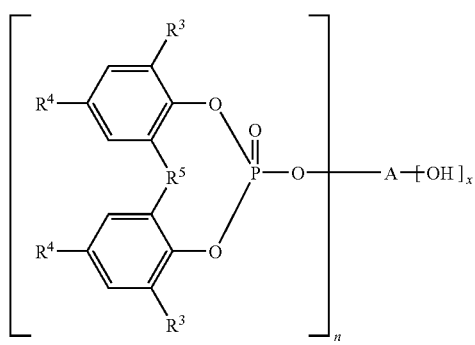

(2)

(wherein $R^3$ represents a $C_4$-$C_8$ alkyl group; $R^4$ represents a hydrogen atom or a $C_1$-$C_8$ alkyl group; $R^5$ represents a $C_1$-$C_4$ alkylidene group; A represents a metal having a valency of n+x; n represents a number of 1 to 3; and x represents a number of 0 to 2).

In the phosphoric acid ester metal salts represented by the above-described General Formula (2), examples of the $C_4$-$C_8$ alkyl group represented by $R^3$ include butyl, isobutyl, secondary butyl, tertiary butyl, pentyl, tertiary pentyl, hexyl, heptyl, octyl, isooctyl, tertiary octyl and the like.

In the General Formula (2), examples of $C_1$-$C_8$ alkyl group represented by $R^4$ include methyl, ethyl, propyl, isopropyl, butyl, isobutyl, secondary butyl, tertiary butyl, pentyl, tertiary pentyl, hexyl, heptyl, octyl, isooctyl, tertiary octyl and the like.

In the General Formula (2), examples of $C_1$-$C_4$ alkylidene group represented by $R^5$ include methylene, ethylidene, 1,1-propylidene, 2,2-propylidene, butylidene and the like.

More specific examples of the compounds represented by the above-described General Formula (2) include the Compound Nos. 7 to 10 shown below. However, the present invention is not restricted at all by the compounds below.

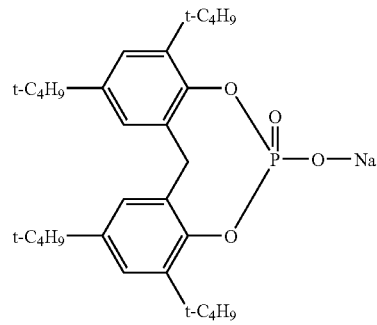

Compound No. 7

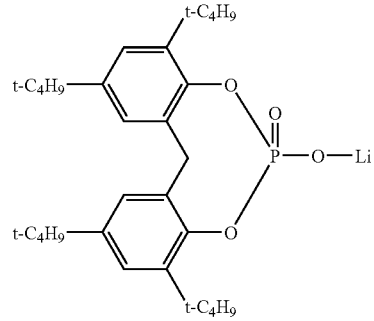

Compound No. 8

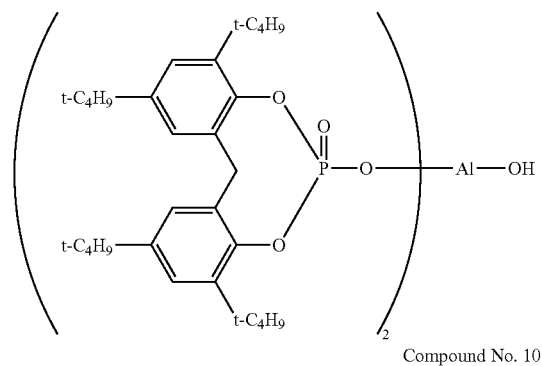

Compound No. 9

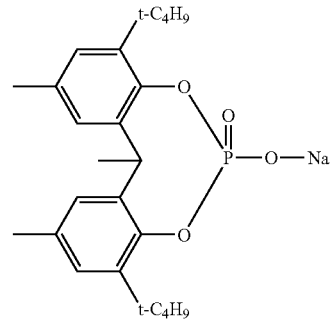

Compound No. 10

It is required that the (C) organic acid metal salt be blended in an amount of 0.3 to 5 parts by weight with respect to 100 parts by weight of the (A) polyolefin resin. If the content of the (C) organic acid metal salt is less than 0.3 parts by weight, sufficient effect is not obtained. On the other hand, if it is more than 5 parts by weight, the crystallinity or the like of the resin to which the master batch is added is influenced and the physical properties of the resin are degraded.

The resin stabilized with the resin additive master batch of the present invention may be any resin such as a thermoplastic resin, thermosetting resin, crystalline resin, noncrystalline resin, biodegradable resin, non-biodegradable resin, synthetic resin, natural resin, general purpose resin, engineering plastics, polymer alloy or the like.

Examples of the synthetic resins include homopolymers and copolymers of α-olefins, such as polypropylene, low density polyethylene, linear low density polyethylene, high density polyethylene, polybutene-1, poly-3-methylpentene, poly-4-methylpentene, ethylene-propylene copolymer; poly-unsaturated compounds between these α-olefins and a conjugated diene or a nonconjugated diene; copolymers between these α-olefins and acrylic acid, methacrylic acid or vinyl acetate; linear polyesters and acid-modified polyesters such as polyethylene terephthalate, polyethylene terephthalate.isophthalate, polyethylene terephthalate.para-oxybenzoate and polybuthylene terephthalate; biodegradable resins such as aliphatic polyester; liquid crystal polyesters; polyamides such as polycaprolactam and polyhexamethylene adipamide; liquid crystal polyamides, polyimides, polystyrenes, copolymers (such as acrylonitrile-styrene copolymer (AS) resins, acrylonitrile-butadiene-styrene (ABS) resins, methyl-methacrylatebutadienestyrene copolymer (MBS) resins, heat-resistant ABS resins) of styrene and/or α-methyl styrene and other monomers (such as maleic anhydride, phenylmaleimide, methyl methacrylate, butadiene and acrylonitrile); halogen-containing resins such as polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate terpolymer, vinyl chloride-acrylic ester copolymer, vinyl chloride-maleate ester copolymer and vinyl chloride-cyclohexylmaleimide copolymers; polymers of (meth) acrylic esters such as methyl (meth)acrylate, ethyl (meth) acrylate, octyl (meth)acrylate; thermoplastic resins such as polyether ketone, polyvinyl acetate, polyvinyl formal, polyvinyl butyral, polyvinyl alcohol, linear or branched polycarbonate, petroleum resin, cumarone resin, polyphenylene oxide, polyphenylene sulfide, thermoplastic polyurethane and fibrous resins; and thermosetting resins such as epoxy resin, phenol resin, urea resin, melamine resin, unsaturated polyester resin, and thermosetting polyurethane. The examples further include isoprene rubber; butadiene rubber; butadiene-styrene copolymerization rubber; butadiene-acrylonitrile copolymerization rubber; acrylonitrile-butadiene-styrene copolymerization rubber; ethylene and propylene; copolymerization rubbers with α-olefin such as butene-1. The examples further include elastomers such as terpolymer rubbers between ethylene-α-olefin and nonconjugated diene such as ethylidenenorbornene or cyclopentadiene; and silicone resins. These resins and/or elastomers may be alloyed or blended.

Examples of the natural resin include natural rubbers, aliphatic polyesters from microorganisms such as 3-hydroxybutyrate, aliphatic polyamide from microorganisms, starch, cellulose, chitin.chitosan, gluten.gelatin and the like.

Although the stabilizing effect varies depending on the resin, that is, on the stereoregularity, specific gravity, the type of polymerization catalyst, whether the polymerization catalyst was removed or not, and if removed, the degree of removal, the degree of crystallinity, the polymerization conditions such as temperature and pressure, the type of the crystals, size of the lamella crystals measured by X-ray small angle scattering, aspect ratio of the crystals, solubility in aromatic or aliphatic solvent, solution viscosity, melt viscosity, average molecular weight, degree of molecular weight distribution, the number of peaks in the molecular weight distribution, when the resin is a copolymer, whether the copolymer is a block copolymer or random copolymer, and the ratio of each monomer, and the like, the master batch of the present invention can be applied to any resin.

The method for blending the resin additive master batch of the present invention to the resin is not particularly restricted, and known techniques for blending a stabilizer in a resin is employed. Any of a method in which the master batch is added to the polymerization system when the synthetic resin is produced by polymerization; a method in which the master batch is added during the polymerization; and a method in which the master batch is added after the polymerization can be employed. In cases where the master batch is added after the polymerization, a method in which the master batch is mixed with the powder or pellets of the synthetic resin to be stabilized with a Henschel mixer or the like and the obtained mixture is kneaded in an extruder or the like; and a method in which the resin additive is used after being formed into a master batch, can be employed. In these cases, the type of the processing machine used, processing temperature, the cooling condition after processing and the like are not particularly restricted, and conditions under which the properties of the obtained resin are suited for the use are preferably selected. The resin additive of the present invention may also be used after being formed into granules individually or in combination with other additive(s).

The resin additive master batch of the present invention is added to the resin at a weight ratio of usually 0.01 to 20 parts by weight, preferably 0.05 to 10 parts by weight with respect to 100 parts by weight of the resin.

In cases where the resin additive master batch of the present invention is used for the stabilization of a resin, various additives which are usually used in various resins are used, as required. These additives may be the same as the above-described resin additive (B) and the organic acid metal salt (C) used in the resin additive master batch of the present invention or may be different from these. Examples of the various additives include phenolic antioxidants, sulfur-containing antioxidants, phosphorus-containing antioxidants, UV absorbers, hindered amine compounds, nucleating agents, flame-retardants, flame-retardant aids, lubricants, fillers, fibrous fillers, metal soaps, hydrotalcites, antistatic agents, pigments, dyes and the like.

Examples of the above-described phenolic antioxidant include 2,6-ditertiary butyl-p-cresol, 2,6-diphenyl-4-octadecyloxyphenol, distearyl(3,5-ditertiary butyl-4-hydroxybenzyl)phosphonate, 1,6-hexamethylenebis[(3,5-ditertiary butyl-4-hydroxyphenyl)]propionic acid amide, 4,4'-thiobis (6-tertiary butyl-m-cresol), 2,2'-methylenebis(4-methyl-6-tertiary butylphenol), 2,2'-methylenebis(4-ethyl-6-tertiary butylphenol), 4,4'-butylidenebis(6-tertiary butyl-m-cresol), 2,2'-ethylidenebis(4,6-ditertiary butylphenol), 2,2'-ethylidenebis(4-secondary butyl-6-tertiary butylphenol), 1,1,3-tris(2-methyl-4-hydroxy-5-tertiary butylphenyl)butane, 1,3,5-tris(2,6-dimethyl-3-hydroxy-4-tertiary butyl benzyl) isocyanurate, 1,3,5-tris(3,5-ditertiary butyl-4-hydroxybenzyl)isocyanurate, 1,3,5-tris(3,5-ditertiary butyl-4-hydroxybenzyl)-2,4,6-trimethyl benzene, 2-tertiary butyl-4-methyl-6-(2-acryloyloxy-3-tertiary butyl-5-methylbenzyl) phenol, stearyl(3,5-ditertiary butyl-4-hydroxyphenyl) propionate, thiodiethylene glycol bis[(3,5-ditertiary butyl-4-hydroxyphenyl)propionate], 1,6-hexamethylenebis[(3,5-ditertiary butyl-4-hydroxyphenyl)propionate], bis[3,3-bis(4-hydroxy-3-tertiary butylphenyl)butyric acid]glycol ester, bis [2-tertiary butyl-4-methyl-6-(2-hydroxy-3-tertiary butyl-5-methylbenzyl)phenyl]terephthalate, 1,3,5-tris[(3,5-ditertiary butyl-4-hydroxyphenyl)propionyloxyethyl] isocyanurate, 3,9-bis[1,1-dimethyl-2-{(3-tertiary butyl-4-hydroxy-5-methylphenyl)propionyloxy}ethyl]-2,4,8,10-tetraoxaspiro[5.5] undecane and triethylene glycol bis[(3-tertiary butyl-4-hydroxy-5-methylphenyl)propionate]. The above-described phenolic antioxidant is used in an amount of 0.001 to 10 parts by weight, more preferably 0.01 to 5 parts by weight with respect to 100 parts by weight of the resin.

Examples of the above-described sulfur-containing antioxidant include dialkyl thiodipropionates such as dilauryl thiodipropionate, dimyristyl thiodipropionate and distearyl thiodipropionate; and β-alkyl mercaptopropionic acid esters of polyols such as pentaerythritol tetra(β-dodecyl mercaptopropionate). The above-described sulfur-containing antioxidant is used in an amount of 0.001 to 10 parts by weight, more preferably 0.01 to 5 parts by weight with respect to 100 parts by weight of the resin.

Examples of the above-described phosphorous-containing antioxidant include trisnonylphenylphosphite, tris[2-tertiary butyl-4-(3-tertiary butyl-4-hydroxy-5-methylphenylthio)-5-methylphenyl]phosphite, tridecyl phosphite, octyldiphenyl phosphite, di(decyl)monophenylphosphite, di(tridecyl)pentaerythritol diphosphite, di(nonylphenyl)pentaerythritol diphosphite, bis(2,4-ditertiary butylphenyl)pentaerythritol diphosphite, bis(2,6-ditertiary butyl-4-methylphenyl)pentaerythritol diphosphite, bis(2,4,6-tritertiary butylphenyl) pentaerythritoldiphosphite, bis(2,4-dicumylphenyl)pentaerythritol diphosphite, tetra(tridecyl) isopropylidenediphenoldiphosphite, tetra(tridecyl)-4,4'-n-butylidenebis(2-tertiary butyl-5-methylphenol)diphosphite, hexa(tridecyl)-1,1,3-tris(2-methyl-4-hydroxy-5-tertiary butylphenyl)butane triphosphite, tetrakis(2,4-ditertiary butylphenyl)biphenylenediphosphonite, 9,10-dihydro-9-oxa-10-phosphaphenanthrene-10-oxide, 2,2'-methylenebis (4,6-tertiary butylphenyl)-2-ethyl hexylphosphite, 2,2'-methylenebis(4,6-tertiary butylphenyl)-octadecylphosphite, 2,2'-ethylidenebis(4,6-ditertiary butylphenyl)fluoro phosphite, tris(2-[(2,4,8,10-tetrakistertiary butyl dibenzo[d,f][1,3,2]dioxaphosphepine-6-yl)oxy]ethyl)amine, phosphite of 2-ethyl-2-butylpropylene glycol and 2,4,6-tritertiary butylphenol. The above-described phosphorous-containing antioxidant is used in an amount of 0.001 to 10 parts by weight, more preferably 0.01 to 5 parts by weight with respect to 100 parts by weight of the resin.

Examples of the above-described UV absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-ditertiary butylphenyl)-5-chlorobenzotriazole, 2-(2'-hydroxy-3'-tertiary butyl-5' methylphenyl)-5-chlorobenzotriazole, 2-(2'-hydroxy-5'-tertiary octylphenyl)benzotriazole, 2-(2'-hydroxy-3',5'-dicumylphenyl)benzotriazole and 2-(2'-hydroxy-3'-tertiary butyl-5'-carboxyphenyl)benzotriazole; benzoates such as phenyl salicylate, resorcinol monobenzoate, 2,4-ditertiary butylphenyl-3,5-ditertiary butyl-4-hydroxybenzoate, 2,4-ditertiary amylphenyl-3,5-ditertiary butyl-4-hydroxybenzoate and hexadecyl-3,5-ditertiary butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; triaryltriazines such as 2-(2-hydroxy-4-octoxyphenyl)-4,6-bis(2,4-ditertiary butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-ditertiary butylphenyl)-s-triazine. The above-described UV absorber is used in an amount of 0.001 to 10 parts by weight, more preferably 0.01 to 5 parts by weight with respect to 100 parts by weight of the resin.

Examples of the above-described other hindered amine compound include 2,2,6,6-tetramethyl-4-piperidylstearate, 1,2,2,6,6-pantamethyl-4-piperidylstearate, 2,2,6,6-tetramethyl-4-piperidylbenzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidylbutanetetracarboxylate, tetrakis(1,2,2,6,6-pentamethyl-4-piperidylbutanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,6,6-pentamethyl-4-piperidyl)-2-butyl-2-(3,5-ditertiary butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tertiary octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis-(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yaminoundecane and 1,6,11-tris[2,4-bis(N-butyl-N-(1,2,2,6,6-pentamethyl-4-piperidyl)amino)]-s-triazine-6-yaminoundecane.

Examples of the above-described nucleating agent include aromatic carboxylic acid metal salts such as aluminum p-t-butyl benzoate and sodium benzoate; alicyclic carboxylic acid metal salts such as disodium bicyclo(2,2,1)heptan-2,3-dicarboxylate; acidic phosphoric acid ester metal salts such as sodium bis(2,4-ditertiary butylphenyl) phosphate, lithium bis (2,4-ditertiary butylphenyl) phosphate and sodium-2,2'-methylenebis(4,6-ditertiary butylphenyl) phosphate; and polyhydric alcohol derivatives such as dibenzylidenesorbitol and bis(methylbenzylidene)sorbitol.

Examples of the above-described flame retardant include halogen-containing flame retardants; phosphorous-containing flame retardants such as red phosphorus, melamine phosphate, guanidine phosphate, phosphoric acid ester compounds and phosphazene compounds; nitrogen-containing flame retardants such as melamine cyanurate; and metal hydroxides such as magnesium hydroxide and aluminum hydroxide. Examples of the flame retardant aid include inorganic compounds such as antimony trioxide and zinc borate; and anti-drip agents such as polytetrafluoroethylene.

The hydrotalcites may be either naturally occurring products or synthetic products, and may be employed irrespective of whether a surface treatment has been performed or not and irrespective of whether it has crystal water. Examples thereof include the basic carbonic acid salts represented by the following General Formula (3):

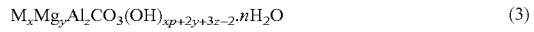
$$M_xMg_yAl_zCO_3(OH)_{xp+2y+3z-2} \cdot nH_2O \quad (3)$$

(wherein M represents an alkaline metal or zinc, x represents a number of 0 to 6, y represents a number of 0 to 6, z represents a number of 0.1 to 4, p represents the valency of M, and n represents the number of 0 to 100 which indicates the number of crystal water).

Examples of the lubricant include fatty acid amides such as laurylamide, myristylamide, stearylamide and behenyl amide; ethylene-bis-stearylamide; polyethylene wax; metal soaps such as calcium stearate and magnesium stearate; and phosphoric acid ester metal salts such as magnesium distearylphosphate and magnesium stearylphosphate.

As the filler, inorganic substances such as talc, silica, calcium carbonate, glass fibers, potassium titanate and potassium borate are used appropriately selecting the particle size when the filler is spherical, and appropriately selecting the fiber diameter, fiber length and aspect ratio when the filler is fibrous. It is preferred to use a subjected to a surface treatment, as required.

Examples of the antistatic agent include cationic antistatic agents such as fatty acid quaternary ammonium ion salts and quaternary polyamine salts; anionic antistatic agents such as higher alcohol phosphoric acid ester salts, higher alcohol EO adducts, polyethylene glycol fatty acid esters, anionic alkyl sulfonic acid salts, higher alcohol sulfuric acid ester salts, higher alcohol ethylene oxide adduct sulfuric acid ester salts and higher alcohol ethylene oxide adduct phosphoric acid ester salt; nonionic antistatic agents such as polyhydric alcohol fatty acid esters, polyglycol phosphoric acid ester and polyoxyethylene alkylallyl ethers; amphoteric alkyl betaines such as alkyl dimethylamino acetic acid betaine, and amphoteric antistatic agents such as imidazoline type amphoteric activators. The antistatic agent may be used individually or two or more of them may be used in combination.

In cases where the resin additive master batch of the present invention is used for an agricultural film, a UV absorber may be blended in order to control the growth of crops, an IR absorber may be blended in order to promote the heat retaining properties, and/or an anti-clouding agent or anti-fogging agent may be blended because fog may be formed in the house or dew condensation occurs on the surface of the film, which prevents the crops from receiving sufficient light.

EXAMPLES

The present invention will be described in more detail below by way of examples thereof. However, the present invention is not restricted by any means by the examples below.

Examples 1-6, Comparative Examples 1-4

To 100 parts by weight of polypropylene (NOVATEC MA3, produced by Japan Polypropylene Corporation), 100 parts by weight of a low melting resin additive (produced by ADEKA CORPORATION, trade name: ADK STAB LA-402, melting point: 33° C.) and any one of the nucleating agents, fillers and clearing agents shown in Table 1 below (in an amount shown in the table) were added, and the mixture was stirred with a Henschel mixer for 20 minutes. The obtained powder was pelletized at 170° C. with an extruder.

The strand during the extrusion was stretched with hands. The strand strength was evaluated by stretching the strand with hands, wherein the strands which were not broken even when they were strongly stretched were evaluated as ⊚, the strands which were broken when they were strongly stretched were evaluated as Δ, and the strands which were broken even when they were weakly stretched were evaluated as X. The mass productivity was evaluated by carrying out continuous production wherein the cases where continuous production was attained for not less than 3 hours were evaluated as ⊚, the cases where the strand was broken in 1 to 3 hours were evaluated as ○, the cases where the strand was broken 1 to 5 times in one hour were evaluated as Δ, and the cases where the strand was broken not less than 6 times in one hour were evaluated as X.

Further, 5 g of the obtained pellets were placed in an envelope sizing 12 cm×8 cm made of a filter paper, and the exuding rate was calculated by dividing the increase in the weight of the envelope after 24 hours at 50° C. by the weight of the pellets in terms of percentage. A larger exuding rate indicates more unsuitability of the quality of the pellets for storage. Further, 20 g of the pellets were placed in a polyethylene bag sizing 10 cm×6 cm and stored at 50° C. for 14 days under a load of 80 g/cm². The pellets were then stored at room temperature for 3 hours, and the state of blocking of the pellets was checked by loosening the pellets with hands. The blocking property was evaluated as follows: the cases where blocking was not observed were evaluated as ○, the cases where partial blocking was observed was evaluated as Δ, and the cases where blocking occurred entirely were evaluated as X.

These results are together shown in Table 1 below.

TABLE 1

|  |  | Examples | | | | | | Comparative Examples | | | |
|---|---|---|---|---|---|---|---|---|---|---|---|
|  |  | 1 | 2 | 3 | 4 | 5 | 6 | 1 | 2 | 3 | 4 |
| Additive Compounds (parts by weight) | Organic acid metal salt compound 1*[1] | 1.0 | — | — | — | — | 0.5 | — | — | — | — |
|  | Organic acid metal salt compound 2*[2] | — | 1.0 | — | — | — | — | — | — | — | — |
|  | Organic acid metal salt compound 3*[3] | — | — | 1.0 | — | — | — | — | — | — | — |
|  | Organic acid metal salt compound 4*[4] | — | — | — | 1.0 | — | — | — | — | — | — |
|  | Organic acid metal salt compound 5*[5] | — | — | — | — | 1.0 | — | — | — | — | — |
|  | Comparative Compound 1*[6] | — | — | — | — | — | — | 1.0 | — | — | — |
|  | Comparative Compound 2*[7] | — | — | — | — | — | — | — | 1.0 | — | — |
|  | Comparative Compound 3*[8] | — | — | — | — | — | — | — | — | 1.0 | — |
| Evaluation Results | Strand Strength | ⊚ | ⊚ | ⊚ | ⊚ | ○ | ○ | Δ | Δ | Δ | X |
|  | Mass Productivity | ⊚ | ⊚ | ⊚ | ⊚ | ○ | ○ | Δ | Δ | Δ | X |
|  | Exuding Rate (%) | 1.2 | 1.3 | 1.5 | 1.5 | 1.4 | 1.3 | 1.9 | 2.2 | 2.9 | 3.5 |
|  | Blocking Property | ○ | ○ | ○ | ○ | ○ | ○ | Δ | Δ | X | X |

*[1]Compound No. 7
*[2]Compound No. 9 + lithium myristate
*[3]aluminum para-t-butylbenzoate
*[4]disodium-bicyclo(2,2,1)heptan-2,3-dicarboxylate (produced by MILLIKEN CHEMICAL, trade name: HPN68)
*[5]sodium benzoate
*[6]talc
*[7]bis(3,4-dimethylbenzylidene)sorbitol (produced by MILLIKEN CHEMICAL, trade name: MILLAD3988)
*[8]Zn glycerolate (produced by UNIQEMA JAPAN, trade name: prifer3881)

As can be seen from the results shown in Table 1, in each of the Examples according to the present invention, it was confirmed that a resin additive master batch was obtained with which the breakage of the strands during production was few and the tackiness of the obtained pellets was low, and which had an excellent handling property.

The invention claimed is:

1. A resin additive master batch comprising 80 to 150 parts by weight of (B) resin additive having a melting point of not higher than 80° C., and 0.3 to 5 parts by weight of (C) organic acid metal salt, with respect to 100 parts by weight of (A) polyolefin resin, wherein said (B) resin additive is a compound represented by General Formula (1):

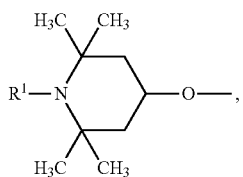

and wherein $R^1$ represents a hydrogen atom, hydroxyl group, $C_1$-$C_{30}$ alkyl group, hydroxyalkyl group, alkoxy group, hydroxyalkoxy group or an oxy radical, and $R^2$ represents a $C_1$-$C_{30}$ alkyl group or a $C_2$-$C_{30}$ alkenyl group.

2. The resin additive master batch according to claim 1, wherein said $R^2$ in said General Formula (1) is a mixture of $C_8$-$C_{26}$ alkyl groups.

3. The resin additive master batch according to claim 1, wherein said (C) organic acid metal salt is a metal organic carboxylate having a cyclic structure, a phosphoric acid ester metal salt compound represented by the following General Formula (2):

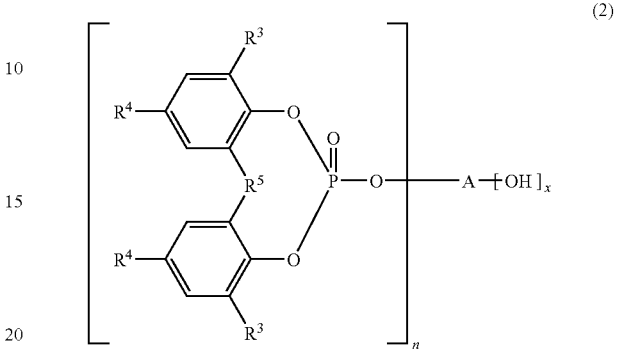

(wherein $R^3$ represents a $C_4$-$C_8$ alkyl group; $R^4$ represents a hydrogen atom or a $C_1$-$C_8$ alkyl group; $R^5$ represents a $C_1$-$C_4$ alkylidene group; A represents a metal having a valency of n+x;

n represents a number of 1 to 3; and x represents a number of 0 to 2), or a mixture thereof.

* * * * *